Oct. 5, 1965 M. G. LEONARD 3,210,750
CABLE TERMINATOR WITH FAULT-CURRENT INDICATOR THEREFOR
Filed March 23, 1961 6 Sheets-Sheet 1

Fig. 1

WITNESSES
Leon M. Garman
James F. Young

INVENTOR
Merrill G. Leonard
BY
Willard R. Crout
ATTORNEY

Oct. 5, 1965   M. G. LEONARD   3,210,750
CABLE TERMINATOR WITH FAULT-CURRENT INDICATOR THEREFOR
Filed March 23, 1961   6 Sheets-Sheet 4

Oct. 5, 1965   M. G. LEONARD   3,210,750
CABLE TERMINATOR WITH FAULT-CURRENT INDICATOR THEREFOR
Filed March 23, 1961   6 Sheets-Sheet 6

United States Patent Office 3,210,750
Patented Oct. 5, 1965

3,210,750
CABLE TERMINATOR WITH FAULT-CURRENT INDICATOR THEREFOR
Merrill G. Leonard, Fowler, Ohio, assignor to Westinghouse Electric Corporation, East Pittsburgh, Pa., a corporation of Pennsylvania
Filed Mar. 23, 1961, Ser. No. 97,897
19 Claims. (Cl. 340—253)

This invention relates to cable terminators in general, and, more particularly, to novel high-voltage cable terminators having fault-current indicators associated therewith.

In recent years there has been considerable interest among utility people regarding underground distribution systems in new subdivisions, shopping centers, etc. in which both the primary and secondary lines are run underground and brought to the surface through a concrete pad, the latter supporting what is known in the trade as a pad-mounted distribution transformer. Such a pad-mounted transformer presents a low silhouette and is attractive in appearance in residential areas. The transformer k.v.a. rating, for example, may range from 10 k.v.a. through 167 k.v.a., with a primary voltage ranging up to 15 kv. The secondary voltage, of course, may be either 120, 220 or 240, 480 volts for example. The interrupting rating of the primary switch may, for example, be 350 amperes with a fault-current developing, say of 5,000 amperes.

There are many advantages to be obtained from the use of pad-mounted transformers for residential underground distribution systems. First, such systems are not only attractive in appearance, but are not vulnerable to sleet and wind storms. By being surface mounted, heat-radiation problems associated with buried or semi-buried transformers are eliminated. Secondly, unsightly overhead lines are avoided and the transformers are more accessible for maintenance than if they were mounted upon poles high above the ground. Thirdly, different-sized k.v.a. transformer units are interchangeable with the same cable-terminator compartment, and since the installation is on the ground level, changeover to a different size k.v.a. rating transformer is readily effected by workmen.

The use of direct-buried or ducted primary cable circuits necessitates suitable cable terminators. Undue electrical stress, or excessive high electrical gradients adjacent the cable ground shield, is conducive to the establishment of corona. As well known by those skilled in the art, corona glow discharges take place at the interface between an electrode and the surrounding air or gas when the electric field strength in the gas reaches a value at which ionization becomes copious, and a glow appearing as bluish tufts or streamers develops at irregularities, such as points, sharp corners, etc. As the voltage increases, the volume of gas in corona increases, and ultimately spark-discharge and arc-over may result. The voltage drop through the gas in corona is less than that before corona, but since both charging and "in phase" currents pass through this region, a wattage power loss develops as a result. During discharge in air, ozone and nitrous acid are usually formed with their corrosive effects. Moreover, discharges may produce high frequency components in the voltage wave to interfere with radio transmission.

High-voltage cables are normally provided with ground shields or sheaths for the purpose of controlling the dielectric stresses imposed on the cable insulation. The ground shield constitutes, in effect, an equipotential surface concentric with the axis of the conductor and its presence causes the electric-field distribution around the conductor to be radial, with maximum potential gradient at every point predictable by calculation, with zero gradient in the longitudinal direction of the cable.

At the cable termination, the ground shield must be removed sufficiently far back from the exposed conductor end to prevent electrical breakdown of the adjacent air between the exposed conductor and the ground shield, and to prevent creepage along the surface of the cable insulation between these points. This, however, results in excessive potential gradients near the terminal edge of the ground shield as hereinafter more fully described.

In order to prevent electrical breakdown at cable termination points, it has been customary at the termination of the ground shield to provide additional taped insulation and a general bell-shaped extension to the ground shield has been provided. This assembly, well known to the art, is called a dielectric stress relief cone, or more briefly, a stress cone.

Such stress cones however, are completely dependent upon the skill of the workman who winds the tape and often are unpredictable in their dielectric qualities because of air spaces, poor centering and lack of homogeneity of the insulating material.

The present invention overcomes these deficiencies by providing a prefabricated stress relief cone made of a cast resin which can be molded to provide a unit of predetermined and consistent dielectric strength. Such a unit is also readily installed by even relatively unskilled workmen.

Accordingly, it is an object of the invention to provide a prefabricated stress relief cone which may be accurately produced and centered upon a high-voltage cable axis independently of the skill of the workmen attaching the same to the cable.

Another object of the invention is to provide a stress relief cone which can be made in any predetermined shape and of predetermined dielectric strength so as to provide consistently and accurately the proper degree of insulation at cable termination points.

Still another object of the invention is to provide a stress cone which is easily installed by relatively unskilled workmen.

Aside from the cable-termination problem to relieve high electrical stress, in a residential or commercial distribution system, involving a number of series-connected distribution transformers, it is desirable to be able to identify the exact location of a fault condition in the system in the underground runs between the several transformer units. If this may be done, then, by suitable switching, alternate feeder connections to the transformers may be arranged, and the faulted underground run isolated from the remainder of the system.

It is a further object of the present invention to provide an improved fault-current indicator associated with the primary service run, and having visual indicating means associated therewith so that a lineman may readily locate a fault condition in the system. In other words, he may locate the fault between adjacent distribution transformers, and by switching said terminating units of the faulted underground run, rearrange the feeder connections and so provide uinterrupted service to the consumers.

Moreover, it is an additional object of the invention to associate such a fault-current indicator with the stress cone assembly to minimize the number of separate component parts and to expedite the installation time. Accordingly, it is another object of the present invention to provide an improved cable-terminator construction for a high-voltage cable preferably having a fault-current indicator associated therewith.

Another object of the present invention is to provide an improved primary-service-unit system having each unit transformer provided with an overcurent relay associated with the primary cable terminator to help in locating a fault condition between an adjacent pair of primary-unit transformers by inspecting indicators on the surface of the transformer casings.

A more specific object of the present invention is to provide an improved cable terminator for relatively high-voltage service having an inexpensive and easily assembled construction, whereby mistakes in assembly, which are common in tape-constructed stress-cone arrangements, are avoided.

Still a further object of the present invention is the provision of a novel overcurrent relay associated with the cable terminator of a primary-service transformer unit, particularly of the type employed in a loop or dual-feed circuit for residential distribution service.

Further objects and advantages will readily become apparent upon reading the following specification, taken in conjunction with the drawings, in which.

Figure 1:
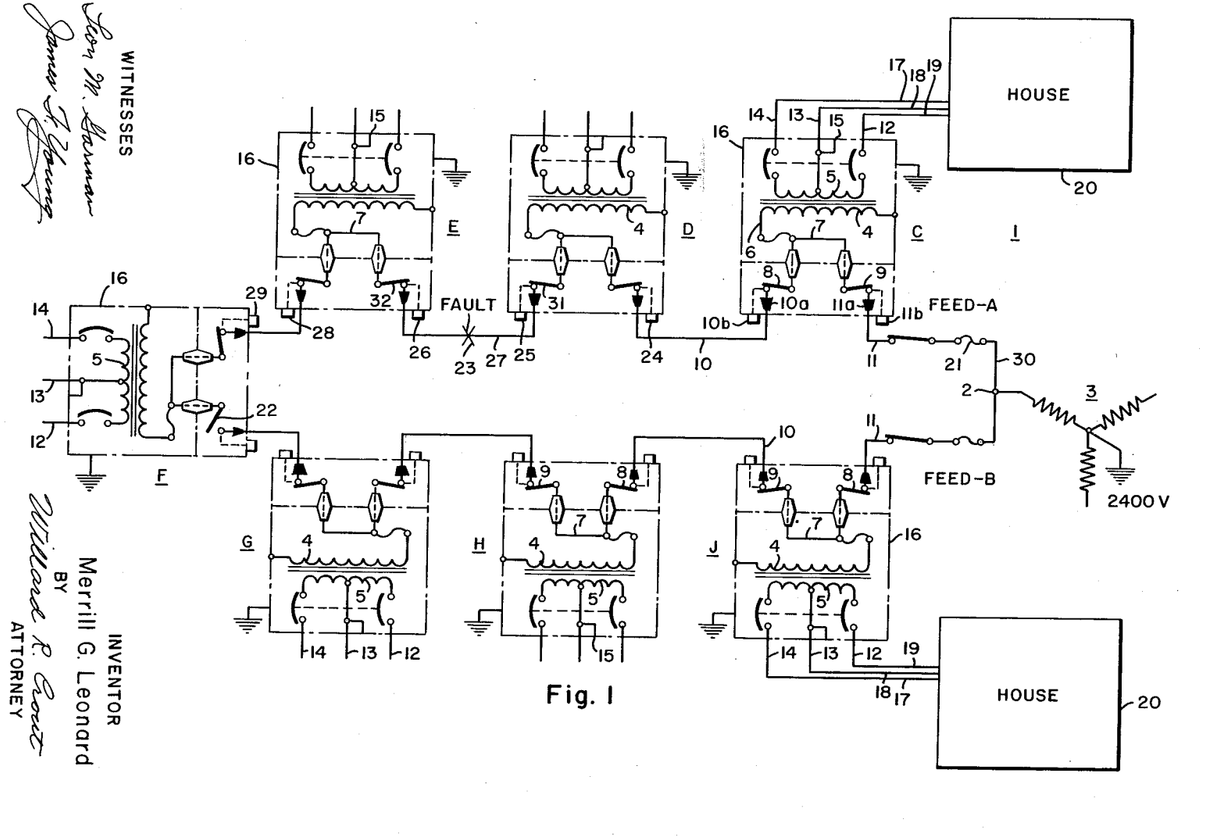
FIGURE 1 is a schematic view of an underground service circuit arrangement illustrating the general layout of a primary-service unit system supplying a residential district with underground service, and indicating the open and closed-circuit positions of the load-break disconnecting switches associated with the series transformer units, a fault condition being indicated.

Referring to the drawings, and more particularly to FIG. 1 thereof, the reference numeral 1 generally designates a primary-service unit system including a plurality of series-connected primary-service unit transformers C, D, E, F, G, H and J, being fed from either feed A or feed B. Feed A and feed B are connected at 2, and are fed by a generator, generally designated by the reference numeral 3. For purposes of description, and not by way of limitation, the primary service voltage is indicated, for example, as being 2400 volts. Although an open loop circuit is shown, it is to be clearly understood that any suitable dual-feed supply could be used.

Considering distribution unit C, for example, it will be noted that there is provided a high-voltage primary winding 4 and a low-voltage secondary winding 5. The high-voltage primary winding 4 is connected, by means of a connector 6, to an intermediate point 7 situated between two disconnecting switches 8, 9 which are illustrated as being closed.

Cables 10, 11 are run underground to adjacent primary service units C, D, E, F, etc. The cables may be directly buried or drawn through buried conduits or ducts.

As shown in FIG. 1, there are provided three secondary low-voltage leads 12, 13 and 14. The low-voltage lead 13 is the neutral conductor, and is grounded, as at 15 to the grounded casing 16. The "hot" leads 12, 14 have 220 volts, for example, impressed thereacross, whereas the voltage between each "hot" lead 12 or 14 and the neutral conductor 13 is 110 volts, as well known by those skilled in the art. The low-voltage secondary leads 12, 13 and 14 are fed through underground cables 17, 18, 19 to the service entrance of a house 20 constituting the consuming load.

Associated with each of the underground high-voltage cables 10, 11 of distribution transformer unit C are cable terminators 10a and 11a, respectively. Associated with each of the cable terminators 10a, 11a of unit C are fault-current indicators 10b, 11b, hereinafter more fully described.

It will be noted that due to the fact that disconnecting switch 22 is open, providing thereby an open-loop circuit, the primary-service units C, D, E and F, are fed from feed A, whereas primary-service units G, H and J are fed from feed B. If, consequently, there should occur a fault at the position 23 between adjacently disposed primary-service units D and E the associated fault-current indicators 24, 25 of unit D would indicate this fact whereas indicator 26 of unit E would not. The fuse cutout 21 at the overhead line 30 would clear the fault and de-energize the primary service line at feed A. More specifically, the fault current would flow through the primary service line 11, 10 and 27 into the fault 23. This would actuate the fault-current indicators 11b, 10b, 24 and 25. However, due to the fact that the disconnecting switch 22 is open, the fault-current indicator 26 and the other fault-current indicators 28, 29 would not be actuated. As a result, the line man would merely inspect the external appearance of the second units and would conclude that the fault location 23 was between units D and E, inasmuch as fault indicator 26 was not actuated, whereas fault indicator 25 was actuated. In such an eventuality, the line man would open load-break disconnecting switches 31, 32, replace the fuse link in primary service cutout 21, and close disconnecting switch 22. This would result in a re-energized circuit situation whereby units C and D would be fed from re-energized feed A; and units E, F, G, H and J would be fed from constantly energized feed B, with the fault 23 isolated between the opened switches 31, 32 of units D and E.

Figures 14, 15:
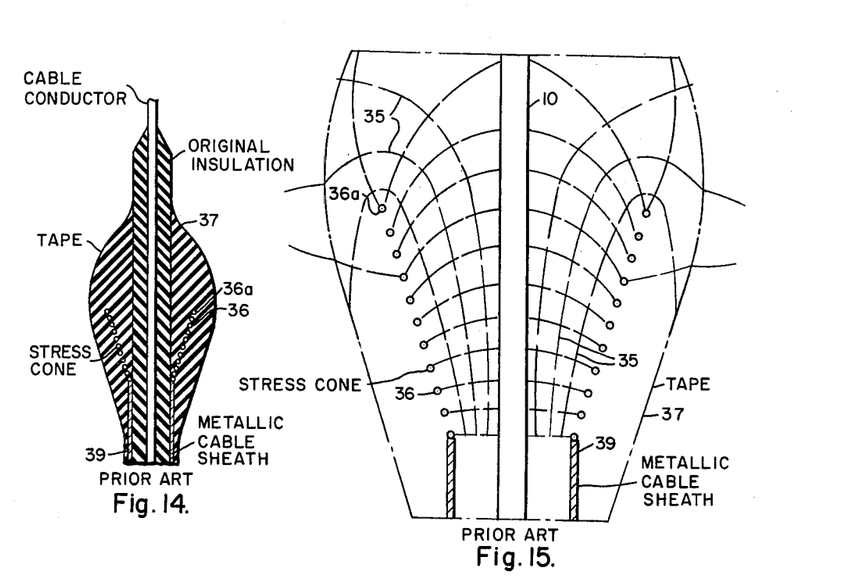
FIG. 14 illustrates a conventional type of stress-cone construction employing a taped arrangement.
FIG. 15 illustrates an electrical field plot of equipotential surfaces and showing the stress of the electrostatic forces at the edge of the stress cone of FIG. 14; and, FIG. 16 illustrates generally the theoretical aspects of the novel stress cone of the present invention in addition to the illustration of the electrical field associated therewith.

In the past, standard practice has been to terminate high-voltage underground cables by means of a "stress cone." As shown in FIG. 14, the stress cone 36 relieves the electrical stress somewhat at the edge 36a of the stress cone 36, but not enough to avoid the necessity for very careful taping at 37 to suppress corona at the edge of the stress shield 36. A plot of the equipotential surfaces 35 is shown in FIG. 15. It will be noted that the voltage gradient is still concentrated at the edge 36a to some extent.

Figure 16:
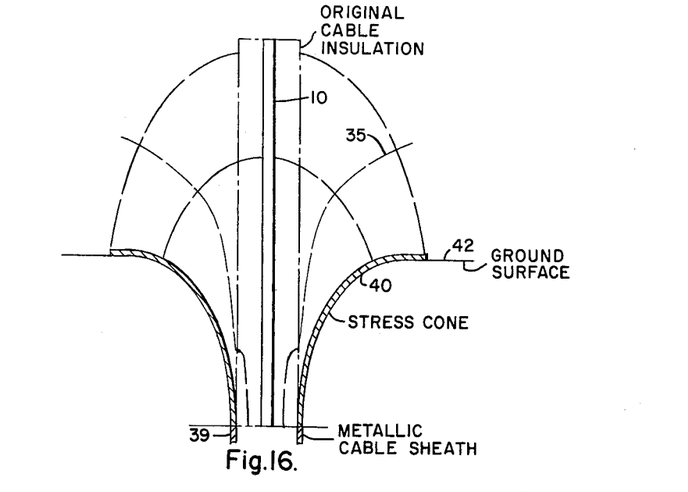

The present invention describes a novel method which takes advantage of the fact that the high-voltage cables 10, 11 (FIG. 1) for the primary-service units C, D, etc., always emerge from the ground at a point very close to the cable termination. The ideal condition is shown in FIG. 16. Here, it will be seen that the electrical field stress around the cable 10 changes very gradually at the termination of the sheath 39 as well as the shield 40, and does not create any point or region where the electrical stress is high enough to cause corona, or flashover. This inherently removes the need for use of the tape 37 at any point on the cable surface.

Figure 6:
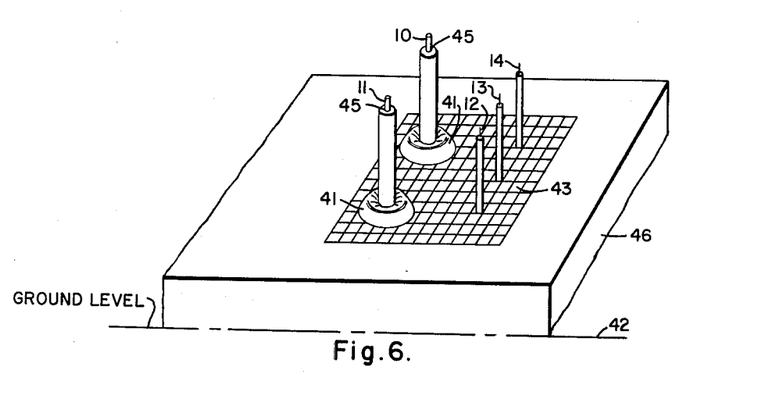
FIG. 6 is a perspective view of the supporting concrete slab or pad showing a modified type of cable terminator associated with the high-voltage cables.

For practical applications, a few modifications may be required, as shown in FIG. 6. Here, the bell-shaped shields 41 around the cables 10, 11 are raised slightly above the ground level 42 to reduce the probability of being submerged in water. It is supported upon a grid 43 of metal wires, provided so as to permit a large opening 44 in the bottom of the primary service unit housing 16. Such an opening is desirable to facilitate assembly over the cable ends 10, 11, 12, 13, 14 projecting upwardly from the ground 42. A concrete pad 46 provides support.

Considerable novelty of the present invention is believed to reside in the use of a grading ring, or stress shield 41, solidly connected to the wire grid 43 or other plane surface at, or near the ground 42, and a cable termination 45 is close proximity to this stress shield 41, so that the combination provides a simple means of connection of the cable 10, 11 to electrical apparatus (such as the unit C) without producing high electrical stresses at any point around the cable.

Figure 7:
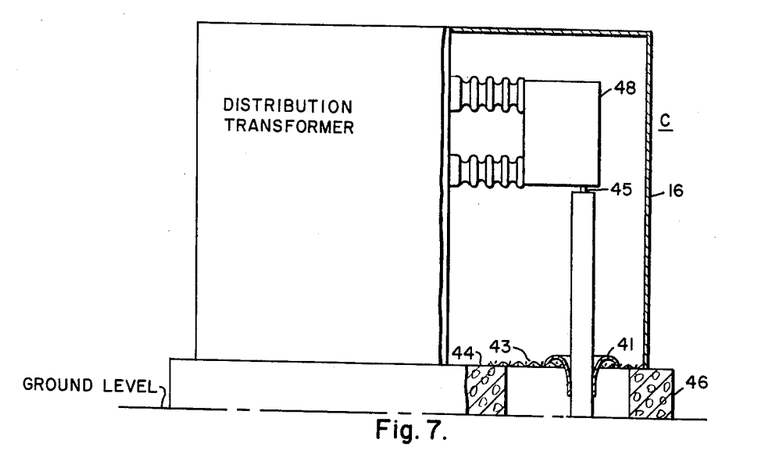
FIG. 7 is a side elevational view, partially in section of the distribution transformer mounted upon the concrete pad of FIG. 6, the load-break disconnecting switch for the high-voltage leads being shown in side elevation.
Figure 8:
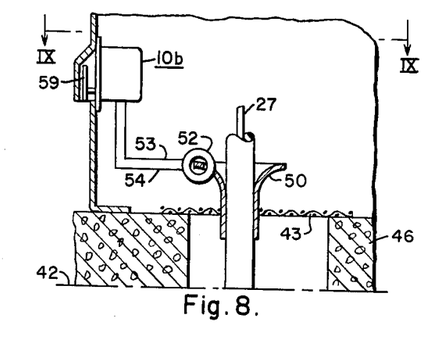
FIG. 8 illustrates, in vertical section, a fault-current relay and indicator device associated with a modified type of cable terminator.
Figure 9:
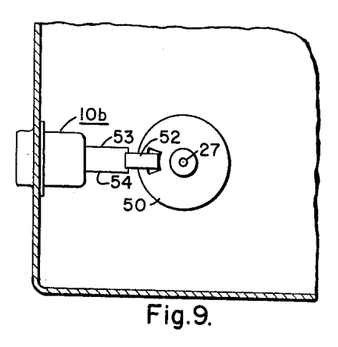
FIG. 9 is a plan view, in section, taken along the line IX—IX of FIG. 8.

The disconnecting switch 48 (FIG. 7) for the primary unit C, functioning in an analogous manner to load-break disconnecting switches 8, 9, 31, 32 of FIG. 1, is described and claimed in United States Patent No. 3,136,875, issued June 9, 1964 to Merrill G. Leonard, and assigned to the assignee of the instant application.

As set forth in FIGURE 1, the primary-service unit system 1 involves the connection of the transformer units C, D, E, etc., in a loop circuit with an open switch 22 at the far side of the loop to provide a dual feed. If a fault occurs at any point, such as 23, heavy current will flow in one side only, and will pass through all of the primary-service unit enclosures C, D up to that point. If the passage of such fault current can be recorded automatically, the faul 23 can be easily identified as to location and isolated promptly. The present invention, in part, relates to such a fault-current indicator for such an identification of the location of a fault condition.

Figure 13:
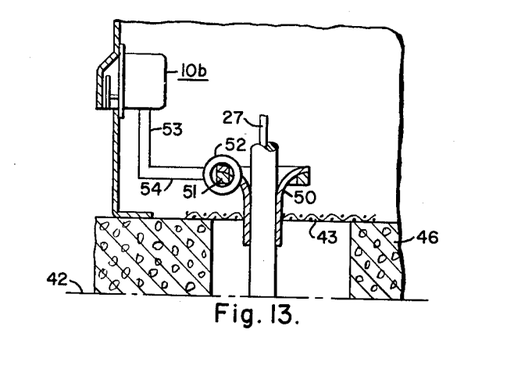
FIG. 13 is a view similar to FIG. 8 but illustrating a modified type of terminator and fault-current indicator.

The present invention, is in part, concerned with the basic elements of such a fault-current indicator device 10b, 11b, 24, 25 or 26. Referring to FIGS. 8–13, current flows in through the cable 27. At or near the surface 42 of the ground, a grading ring 50 is provided. This ring 50 serves a new function, however; it is not only an electrostatic shield, but it also is a carrier of magnetic flux. To make this practical, the ring 50 may be made of magnetic material, such as steel, or an additional laminated ring 51 may be incorporated as shown in FIG. 13. Now to make a simple current transformer, it is only necessary to add a secondary coil 52 to link with part of, or all of the flux carried by stress ring 50. The current induced within coil 52 is fed by leads 53, 54 directly into actuating coil 55 of over-current relay 57.

Normally, this current is so small that the power loss is negligible, and the relay 57 is not actuated. However, at a given high level of current, the magnetic pull of coil 55 is high enough to lift armature 58, thus relieving indicator flag 59 at latch 60, which then drops the flag 59 to the position shown in FIG. 12. The armature 58 is pivotally mounted at 58a to bracket 58b shown in FIG. 10 and carries the holding latch 60. The signal flag has a latch portion 59a normally held by the latch 60.

Figure 10:
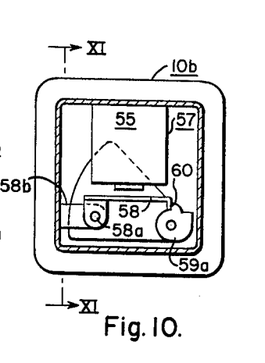
FIG. 10 illustrates, in section, the overcurrent relay of FIG. 8, the view being taken along the line X—X of FIG. 11, the indicator being latched in its non-indicating position.
Figure 11:
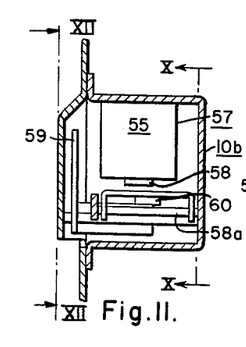
FIG. 11 is a sectional view taken along the line XI—XI of FIG. 10.
Figure 12:
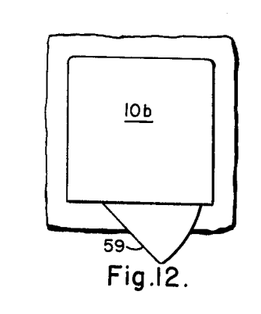
FIG. 12 is a view taken in the direction of the line XII—XII of FIG. 11, illustrating the indicator of FIGS. 8–11 in the indicating position.

Resetting is easily done by pushing the flag 59 up into its latched position, as shown in FIG. 10. It is believed that considerable novelty consists first in the use of an overcurrent relay 57 in each unit C, D, E, etc., of the primary-service system 1 (FIG. 1) to help locate a fault 23, and secondly in the combination of the current-sensing element 57 with the electrostatic shield 50 on the lead-in cable 10 or 27.

Figure 2:
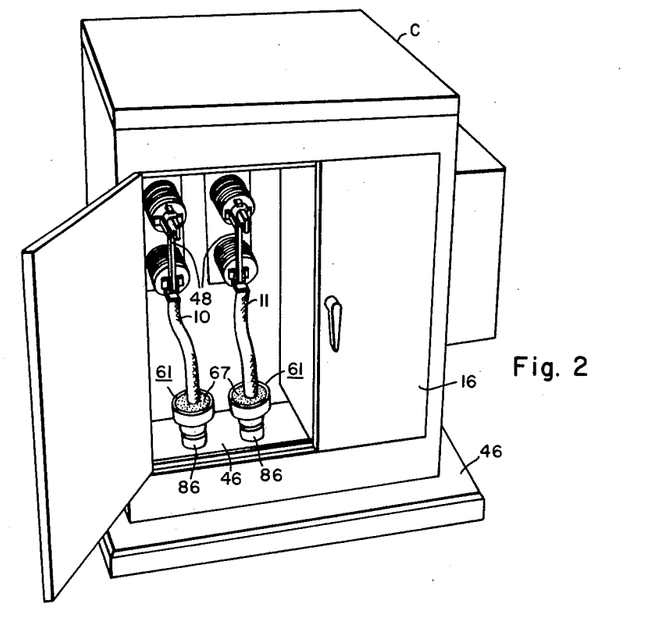
FIG. 2 illustrates in enlarged perspective, a primary-service unit, or a pad-mounted distribution transformer, with the door opened to show the high-voltage compartment and the high-voltage cable terminators.
Figure 3:
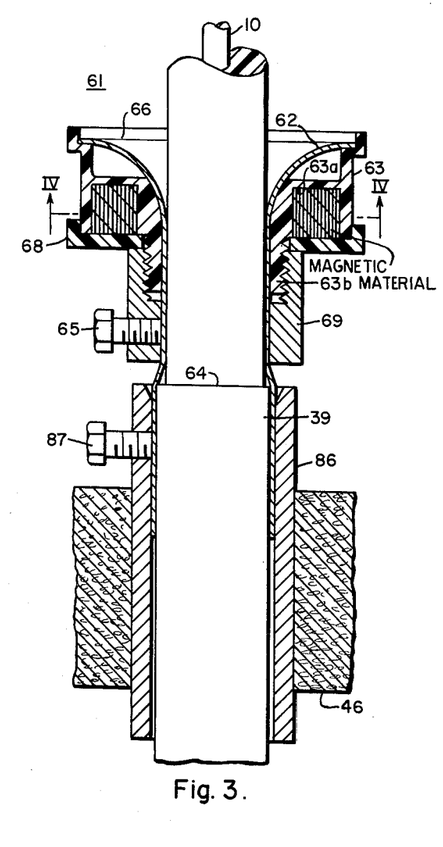
FIG. 3 illustrates, in vertical section, the prefabricated cable terminator and fault-current indicator of the present invention.
Figure 4:
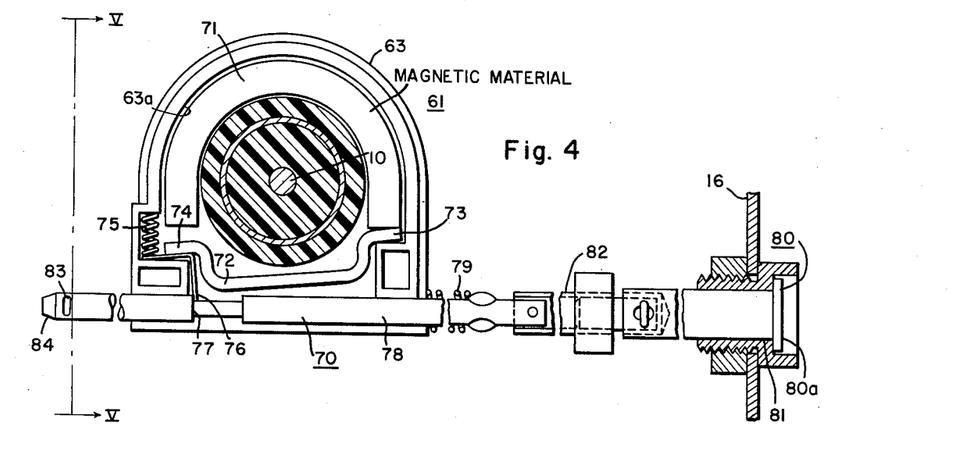
FIG. 4 illustrates an inverted view, in section, taken along the line IV—IV of FIG. 3 the magnetic structure and indicator rod of the terminator and indicator assembly of FIG. 3.
Figure 5:
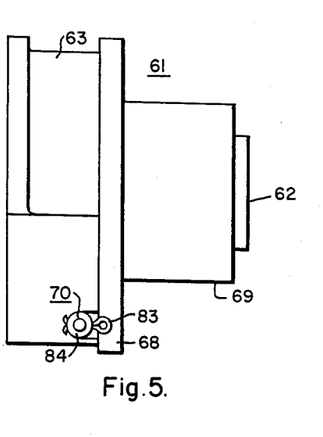
FIG. 5 is a side elevational view of the prefabricated cable terminator and indicator assembly of FIG. 4, taken along the line V—V thereof.

FIGS. 3–5 illustrate a modified type of prefabricated high-voltage terminator 61 having a fault-current indicator 70 associated therewith. Its use in a pad-mounted transformer unit C is illustrated in FIG. 2 of the drawings. With reference to FIG. 3, it will be observed that the electrical stress cone 62 is comprised simply of a bell-shaped metallic shield mounted inside of a molded plastic housing 63 so that it can be fitted over a high-voltage cable 10 or 11, which have previously been stripped of their metallic sheaths 39 down to the point 64. After assembly, a firm electrical contact, as well as mechanical security, is obtained by tightening screw 87 to compress the stress shield 62 against metallic sheath 39. No other operation is necessary, although there has been provided a molded recess 66 in the top of the molded housing 63, so that it could be filled with a sealant, or possibly with a mixture of silicon-carbide crystals 67 (FIG. 2), if such action is necessary to improve still further the resistance to formation of corona at the termination of the ground at the outside of the cable.

The fault indicator 70 is comprised of a steel yoke 71 forming a magnet, which, of course, is actuated by flow of current through the cable 10. At a predetermined level of current, usually of the order of 250 amperes, the magnetic flux surrounding the primary current will be sufficient in magnitude to move the armature 72. This armature 72 is free to pivot about its right end 73 by being loosely held betweeen the magnet and the molded case 63. Its left-hand end 74 is spaced away from the magnet yoke 71 by a compression spring 75. When the magnetic force becomes sufficient to overcome spring 75, then the armature 72 closes and latch 76 carried thereby is released from shoulder 77 formed on the trip rod 78. This indicating rod 78 then moves to the right under the force of spring 79, which causes the indicator button 80 to move externally out of the transformer housing 16. Preferably, indicator button 80 will be of an inconspicuous color on its outer surface 80a, but on the inner surface and on stem 81, it will be colored a bright red, or other noticeable color. This is to reduce the danger of tampering when the indicator 78 is not tripped, and to add to the contrast of color when it is tripped.

The plastic housing 63 is comprised of a moldable material, such as a suitable synthetic resinous material. One such resinous material, which is particularly advanageous, is polyester glass resin. The plastic housing 63 has a molded recess 63a to accommodate the U-shaped magnetic yoke 71. In addition, the housing 63 has a sleeve portion 63b, which is threaded, as shown in FIG. 3, to receive a metallic bushing 69 supporting the grounding and clamping screw 65.

Interposed between the metallic bushing 69 and the upper molded housing 63 is a molded bottom cover 68 of a suitable molding material, such as polyester glass resin.

A cotter pin 83 passing through the left-hand end 84 of the indicator rod 78 serves as a stop for rightward indicating movement of the indicator rod 78.

To assist in maintaining the cable 10 in proper position, a metallic conduit 86 with a cable clamping screw 87 may be provided supported in the concrete pad 46, as shown more clearly in FIGS. 2 and 3 of the drawings.

Preferably an adjusting sleeve 82 is provided for adjustment of the trip mechanism and assembly. To reset the button 80, it is merely necessary to push inward until latch 76 re-engages shoulder 77.

From the foregoing description of the invention, it will be apparent to those skilled in the art that there is provided a novel cable-terminating structure 61, which possesses important utility, per se. In combination with the terminator 61 there is preferably provided a fault-current indicator 70, which constitutes a unitary assembly which is readily placed into position by unskilled personnel with no chance of misassembly.

It is believed that the use of such a stress-cone assembly 61, provided in a premolded casing results in a stress-free condition at the cable termination point. The incorporation with the stress-cone assembly 61 of the fault-current indicator 70 results in a compact assembly, foolproof in operation, and providing a precise indication of the exact location of a fault condition 23 existing in the connected circuit 1 (FIG. 1).

Although there has been illustrated and described specific structures, it is to be clearly understood that the same were merely for the purpose of illustration, and that changes and modifications may readily be made therein by those skilled in the art, without departing from the spirit and scope of the invention.

I claim as my invention:

1. A prefabricated stress cone assembly for a high-voltage cable termination including a molded housing formed of a moldable material, the housing being generally cylindraceous with the central aperture therethrough having a first predetermined diameter at one end of the housing and a second predetermined diameter at the other end of the housing large relative to the first diameter, the other end of the housing including means forming an annular surface extending substantially perpendicular to the axis of the aperture, and a generally conically shaped stress cone composed of conductive material at least partially supported by said molded housing, the stress cone having an outwardly flaring edge which abuts against the annular surface of the housing, the narrow end of the stress cone having an outer diameter such that said narrow end of the cone will pass through the aperture in the housing at said one end of the housing, the narrow end of the stress cone having an inner diameter such that the narrow end of the stress cone will slide over the sheath of the cable.

2. A prefabricated stress cone assembly according to claim 1 including in addition electrical engaging means for securely electrically engaging said generally conically shaped metallic stress cone with the ground cable sheath of the cable.

3. A prefabricated stress cone assembly according to claim 1 in which the housing is additionally characterized as having an extended sleeve portion externally threaded, and including in addition an internally threaded metallic bushing in threaded engagement with the sleeve portion and extending beyond the end of the sleeve portion, and clamping screw means in the extended end of the metallic bushing, the clamping screw means securing the bushing to the sheath of the cable.

4. The combination with a high-voltage cable terminator for effecting the termination of a high-voltage cable of a fault-current indicator, said high voltage cable terminator including a generally conically-shaped stress cone, and said fault-current indicator including a magnetic yoke substantially encircling the high voltage cable, the yoke also substantially encircling the stress cone, housing means securely mounting the yoke and stress cone in position with respect to each other, a movable armature in the housing means magnetically coupled to the yoke, and indicating means actuated by attractive movement of said movable armature incident to fault current passing through the cable.

5. The combination according to claim 4 in which the housing means is additionally characterized as having an extended sleeve portion externally threaded, and including in addition an internally threaded metallic bushing in threaded engagement with the sleeve portion and extending beyond the end of the sleeve portion, and clamping screw means in the extended end of the metallic bushing, the clamping screw means securing the bushing to the sheath of the cable.

6. The combination according to claim 4 including in addition a resin and epoxy filler disposed in the stress cone and substantially filling all the space inside the cone between the cable and the inner wall of the cone.

7. A unitary prefabricated stress-cone and fault-current indicator assembly adapted for telescopic insertion over a high-voltage service cable comprising, in combination, a generally cylindraceous casing molded from a suitable molding material, a generally conically-shaped metallic stress cone supported in said generally cylindraceous casing and having an outwardly extending flared lip portion at the end of large diameter thereof, said casing providing a recess portion adjacent the stress cone, the recess portion of the casing being disposed at a predetermined position along the axis of the stress cone therein and between the extending flared lip portion and the end of small diameter of the cone, a U-shaped magnetic yoke disposed within said recess portion, movable indicating means adapted to be moved from a normal non-indicating position to an indicating position whereat the indicating means is visually observable, means biasing said indicating means to a visually-observable position, and latching means for said indicating means including a movable armature, the latching means normally retaining the indicating means in said non-indicating position,, the armature upon being attracted to said yoke on fault currents releasing said indicating means.

8. The combination of claim 7, wherein mechanical clamping means are provided to clamp the stress cone to the external side of the grounded cable sheath.

9. An alternating current distribution system comprising, in combination, a source of alternating current potential, a plurality of transformers each having a primary and a secondary, circuit means connected to said source for energizing the primaries of the transformers, each transformer having one terminal of the primary thereof connected to a common circuit point, a pair of disconnect switches for each transformer, each transformer having the other terminal of the primary thereof connected to one terminal of both switches of said pair of disconnect switches, cable means connecting the other terminal of one disconnect switch at one transformer to the corresponding other terminal of a disconnect switch of another transformer, the cable means having at each end thereof means for indicating when a fault current occurs in the cable means, the means for indicating a fault current including a cone-shaped ring composed of ferromagnetic material disposed around the cable means near the end thereof, the cone-shaped ring having a flaring portion at one end thereof, the flaring portion of the cone-shaped ring being cut away at a predetermined position thereon, coil means disposed in said cut away portion and electrically insulated from the ring, a portion of the wall of the cone-shaped ring passing through the coil means to form a current transformer, an overcurrent relay having a movable member movable from a normal position to an overcurrent indicating position in response to energization of the relay, and lead means connecting the relay to the coil means, a fault current flowing in the cable means causing an increased magnetic flux in the ring of ferromagnetic material thereby inducing a current in the coil means of sufficient magnitude to energize the overcurrent relay and give an indication that a fault current has occurred.

10. A distribution system according to claim 9 in which the circuit means is additionally characterized as having a first branch including at least two primaries of two transformers with first switching means for individually connecting one end of the first branch to the source of alternating current potential, a second branch including at least two primaries of two transformers, the second branch having second switching means for individually connecting one end of the second branch to the source of alternating current potential, and further switching means for connecting the other end of the first branch to the other end of the second branch.

11. A system according to claim 9 including in addition a further ring of magnetic material of substantially the same outer diameter as the outer diameter of the flaring portion of the cone-shaped ring, the further ring being disposed adjacent the surface of the cone-shaped ring, magnetic flux being induced in the further ring, the further ring passing through the coil means and increasing the flux linking the coil means thereby rendering the overcurrent relay more sensitive to fault currents in the cable means.

12. A system according to claim 9 including in addition a base for mounting the transformers and a wire grid, ind wherein the cone-shaped rings of ferromagnetic material are additionally characterized as being mounted in said wire grid and maintained at ground potential, and in which the base has a plurality of large apertures therein through which the cable means passes, each of the apertures being closed at one end thereof by said wire grid.

13. A distribution system according to claim 9 in which the plurality of transformers are mounted inside a housing having a partition therein and the pairs of disconnect switches are mounted on bushings on said partition, the disconnect switches being mounted substantially above the cables extending between disconnect switches of the transformers whereby each cable is brought in a substantially vertical position to the switch, and a wire mesh covering at least a portion of the floor of the housing, the cone-shaped ring being secured to the wire mesh, the mesh being at ground potential.

14. As an article of manufacture, a cable terminal device for an electrical cable of the type having a central conductor surrounded by a flexible sleeve of insulating material surrounded by a sheath of conductive material, the terminal device providing means for distributing the electrostatic stress at the end of the cable to reduce corona and reduce the possibility of electrical breakdown and for providing an indication when a fault current occurs in said cable, the device including a molded housing composed of a non-conductive moldable material, the housing consisting generally of an extended cylindrical sleeve portion adapted to be slapped over the end of the cable and of an annular portion having a recess forming an annular shoulder therein, a metallic cone-shaped member having the narrow end thereof extending through the cylindrical sleeve portion of the housing and having the end of large diameter flaring to form a lip portion disposed adjacent the annular shoulder in the housing, the narrow portion of small diameter of the cone-shaped member being adapted to slip over the sheath of the cable and to be clamped to the cable sheath to form a secure connection, the housing including an annular passageway near the shoulder therein, a U-shaped yoke member composed of magnetic material disposed in the annular passageway and extending partially around the cone-shaped member, a movable armature having one end thereof adjacent one end of the yoke member and the other end thereof near the other end of the yoke member, means normally biasing said other end of the armature away from the yoke member whereby the magnetic force developed in the yoke member is sufficient to draw the other end of the armature to the yoke member only when a fault current of at least a predetermined amplitude occurs in the cable, latch means normally held in latching position by the other end of the armature, the latch means being released when the other end of the armature is drawn to the yoke member, and a spring biased movable indicating member normally held in a non-indicating position by the latch means, the releasing of the latch means releasing the indicating member which thereupon moves under the force of the spring to an indicating position.

15. A cable terminal device according to claim 14 in which the indicating member is additionally characterized as having a portion at one end thereof colored a preselected color, said colored portion being normally not visible until a fault current has occurred releasing the indicating member and permitting the indicating member to move to an indicating position.

16. Cable terminating apparatus for a high voltage cable comprising, in combination, mounting means composed of a hard durable non-conductive material having an aperture therethrough at least greater in diameter than the diameter of the cable, a wire grid at ground potential covering the aperture, the grid having an aperture therein through which the cable passes, a cone-shaped member composed of ferromagnetic material located in the aperture in the wire grid and having the portion of small diameter thereof snugly engaging the outer sheath of the cable, the flaring lip portion of large diameter of the cone-shaped member having an opening therethrough near the edge thereof, a first coil disposed partially within the opening in the flaring lip portion of the cone-shaped member, a segment of the flaring lip portion of the cone-shaped member passing through the central aperture of the first coil, the cone-shaped member of ferromagnetic material normally having a magnetic flux flowing around the periphery thereof which varies with variations in the value of the current in the cable, overcurrent relay means having an actuating coil and a movable flag normally maintained in a non-indicating position, and lead means connecting the first coil to the actuating coil of the overcurrent relay means, a fault current in the cable producing a magnetic flux of sufficient magnitude in the cone-shaped member to generate a signal of sufficient amplitude in the first coil to actuate the overcurrent relay means and move the flag to an overcurrent indicating position.

17. Apparatus according to claim 16 including in addition an additional ring of laminated magnetic material having a high permeability disposed adjacent the flaring outer lip of the cone-shaped member, the additional ring passing through the first coil and increasing the flux linkage of the turns of the first coil.

18. Apparatus according to claim 16 additionally characterized as including means for clamping the narrow end of the cone-shaped member to the sheath of the cable.

19. Cable terminator apparatus for a high voltage cable, the cable having a portion at the end thereof stripped of its outer sheath, comprising in combination, a cone-shaped member composed of ferromagnetic material, the stripped end portion of the cable passing through the cone-shaped member, the cone-shaped member having a portion of small diameters thereof snugly fitting the cable and making electrical connection with the sheath of the cable whereby the cone-shaped member forms an electrostatic stress cone, the cone-shaped member having a flaring lip portion of a diameter large relative to that of the first-named portion, the flaring lip portion having an aperture therein near the edge thereof, a coil disposed in said aperture with a segment of the flaring lip portion of the cone-shaped member substantially passing through the coil to form a current transformer, the cone-shaped member of ferromagnetic material normally having a magnetic flux flowing around the periphery thereof which varies with variations in the value of the current in the cable, overcurrent indicating means, and lead means operatively connecting the overcurrent indicating means to the coil, said overcurrent indicating means being energized by the signal induced in the coil when a fault current in the cable produces a magnetic flux of sufficient magnitude in the cone-shaped member.

References Cited by the Examiner
UNITED STATES PATENTS

| | | | |
|---|---|---|---|
| 579,473 | 3/97 | Davidson et al. | 200—106.13 X |
| 623,444 | 4/99 | Valentine. | |
| 765,037 | 7/04 | O'Connor | 340—376 |
| 861,290 | 7/07 | Koons | 340—281 |
| 933,412 | 9/09 | Baker. | |
| 973,676 | 10/10 | Lungen | 340—376 |

(Other references on following page)

UNITED STATES PATENTS

| | | | |
|---|---|---|---|
| 1,082,368 | 12/13 | Swanson | 340—277 |
| 1,239,795 | 9/17 | Klipphahn. | |
| 1,492,686 | 5/24 | Hamill | 200—106.13 |
| 1,599,936 | 9/26 | Williams | 340—277 |
| 1,775,530 | 9/30 | Jansson | 174—139 X |
| 1,825,514 | 9/31 | Fitzgerald | 324—127 X |
| 1,852,614 | 4/32 | Johnson et al. | 200—87.1 |
| 1,934,264 | 11/33 | Hefner | 340—253 |
| 1,971,207 | 8/34 | Boyajian et al. | 324—127 |
| 2,013,241 | 9/35 | Hefner. | |
| 2,445,110 | 7/48 | Gauvreau | 317—38 XR |
| 2,452,060 | 10/48 | Klemperer | 340—248 X |
| 2,709,800 | 5/55 | Temple et al. | 340—253 |
| 2,804,577 | 8/57 | Roth | 317—14.9 X |
| 2,924,641 | 2/60 | Priaroggia | 174—73 |
| 2,945,913 | 7/60 | Conangla | 174—73 |
| 2,957,151 | 10/60 | Jennings | 174—73 X |
| 3,014,158 | 12/61 | Nelson et al. | 317—15 |

NEIL C. READ, *Primary Examiner.*

BENNETT G. MILLER, *Examiner.*